(12) United States Patent
Dang et al.

(10) Patent No.: US 11,056,900 B2
(45) Date of Patent: Jul. 6, 2021

(54) CHARGING METHOD, CHARGING DEVICE, AND COMPUTER-READABLE MEDIUM FOR CHARGING A BATTERY

(71) Applicant: NINGDE AMPEREX TECHNOLOGY LIMITED, Ningde (CN)

(72) Inventors: Qi Dang, Ningde (CN); Chao Gao, Ningde (CN); Qiang Zheng, Ningde (CN); Zhanzhao Fang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 70 days.

(21) Appl. No.: 16/261,187

(22) Filed: Jan. 29, 2019

(65) Prior Publication Data
US 2019/0237974 A1    Aug. 1, 2019

(30) Foreign Application Priority Data

Jan. 31, 2018    (CN) .......................... 201810094910.9
Sep. 30, 2018    (CN) .......................... 201811156805.X

(51) Int. Cl.
*H02J 7/00*    (2006.01)
(52) U.S. Cl.
CPC .......... *H02J 7/007* (2013.01); *H02J 7/00714* (2020.01); *H02J 7/007182* (2020.01)
(58) Field of Classification Search
CPC .. H02J 7/007; H02J 7/00714; H02J 7/007182; H02J 7/0071; H02J 7/00712; H02J 7/007184; H02J 7/008; H01M 10/44
(Continued)

(56) References Cited

U.S. PATENT DOCUMENTS 5,596,259 A * 1/1997 Mino ...................... H02J 7/008
                                                              320/157
6,104,165 A * 8/2000 Miyamoto ............ H01M 10/44
                                                              320/125
(Continued)

FOREIGN PATENT DOCUMENTS

CN         1409432 A      4/2003
CN       105870526 A      8/2016
(Continued)

OTHER PUBLICATIONS

Search Report appended to an Office Action, which was issued to Chinese counterpart application No. 201811156805.X by the CNIPA dated May 28, 2020, with an English translation thereof (4 pages).

(Continued)

*Primary Examiner* — M Baye Diao
(74) *Attorney, Agent, or Firm* — Hamre, Schumann, Mueller & Larson, P.C.

(57) ABSTRACT

A charging method is proposed to include the steps of: in a first stage of charging, charging a battery with a first-stage current until a voltage of the battery reaches a first-stage voltage value; and in a second stage of charging, charging the battery with a second-stage current until the voltage of the battery reaches a second-stage voltage value which is greater than the first-stage voltage value. The second-stage current is smaller than the first-stage current.

17 Claims, 11 Drawing Sheets

(58) Field of Classification Search
USPC .......................................................... 320/128
See application file for complete search history.

(56) References Cited

U.S. PATENT DOCUMENTS

| | | | | |
|---|---|---|---|---|
| 7,321,219 | B2* | 1/2008 | Meyer | H02J 7/0036 320/125 |
| 8,148,942 | B2* | 4/2012 | Densham | H02J 7/0018 320/116 |
| 9,634,511 | B2* | 4/2017 | Zhao | H02J 7/00 |
| 2004/0195996 | A1* | 10/2004 | Nishida | H02J 7/0071 320/103 |
| 2010/0327810 | A1* | 12/2010 | Jimbo | H02J 7/007182 320/126 |
| 2011/0181249 | A1* | 7/2011 | Deguchi | H01M 10/0525 320/149 |
| 2019/0237974 | A1* | 8/2019 | Dang | H02J 7/007 |

FOREIGN PATENT DOCUMENTS

| | | | | |
|---|---|---|---|---|
| CN | 107148699 | A | 9/2017 | |
| JP | 2011108550 | A * | 6/2011 | ........... Y02E 60/122 |

OTHER PUBLICATIONS

Search Report appended to an Office Action, which was issued to Chinese counterpart application No. 201811156805.X by the CNIPA on Sep. 7, 2020, with an English translation thereof (4 pages).

* cited by examiner

CHARGING METHOD, CHARGING DEVICE, AND COMPUTER-READABLE MEDIUM FOR CHARGING A BATTERY

CROSS-REFERENCE TO RELATED APPLICATION

This application claims priority of Chinese Invention Patent Application Nos. 201810094910.9 and 201811156805.X, filed on Jan. 31 and Sep. 30, 2018, respectively.

FIELD

The disclosure relates to a battery technology, and more particularly to a charging method, a charging device, and a computer-readable medium for charging a battery.

BACKGROUND

Lithium-ion battery is one type of rechargeable battery, which is widely used in consumer products, computerized products, power products, etc., and in the fields of medicine, security, etc.

How to charge a lithium-ion battery is one of the key technologies in lithium-ion battery applications. In a commonly used conventional charging method, the lithium-ion battery is charged in two stages, the first one of which is constant current charging and the second one of which is constant voltage charging. In detail, a constant current is used to charge the lithium-ion battery until a voltage of a battery cell (i.e., a voltage between a positive electrode and a negative electrode of the battery cell, where the voltage is monitored during the charging) of the lithium-ion battery reaches a charging limit voltage of the battery cell, and then a constant voltage that equals the charging limit voltage is used to charge the lithium-ion battery, and a charging current that charges the lithium-ion battery gradually reduces during the constant voltage charging. When the charging current has reduced to a cut-off charging current value, the charging is finished, and the battery cell of the lithium-ion battery is in a fully-charged state.

In the conventional charging method, a cathode potential of the lithium-ion battery gradually increases during the constant voltage charging, so the charging speed gradually reduces. And the cathode of the battery cell may maintain high potential for a relatively long time, which may easily induce a side reaction that results in structural damage of the cathode material or acceleration in consuming the electrolyte of the battery cell, and therefore shorten the lifetime of the lithium-ion battery.

SUMMARY

Therefore, an object of the disclosure is to provide a charging method for charging a battery, and a computerized terminal, a computer-readable medium, and a charging device for implementing the charging method. The charging method can reduce a time length of a cathode of the battery staying at high potential during charging, so as to prolong a life time of the battery, and to reduce a time required for fully charging the battery.

According to the disclosure, the charging method includes: in a first stage of charging, charging a battery with a first-stage current until a voltage of the battery reaches a first-stage voltage value; and in a second stage of charging, charging the battery with a second-stage current until the voltage of the battery reaches a second-stage voltage value. The second-stage voltage value is greater than the first-stage voltage value, and the second-stage current is smaller than the first-stage current.

According to the disclosure, the compute-readable medium stores one or more programs. The one or more programs include a plurality of instructions. When the plurality of instructions are executed by a computerized terminal with one or more processors, the plurality of instructions cause the computerized terminal to perform a charging method including:

in a first stage of charging, charging the battery with a first-stage current until a voltage of the battery reaches a first-stage voltage value; and in a second stage of charging, charging the battery with a second-stage current until the voltage of the battery reaches a second-stage voltage value.

The second-stage voltage value is greater than the first-stage voltage value, and the second-stage current is smaller than the first-stage current.

According to the disclosure, the charging device includes a charging-discharging module and a control unit. The charging-discharging module is adapted to be electrically connected to a battery for charging or discharging the battery. The control unit is electrically connected to the charging-discharging module, and is configured to operate in one of a first stage and a second stage of charging, wherein the control unit controls the charging-discharging module to charge the battery. When the control unit operates in the first stage of charging, the control unit controls the charging-discharging module to charge the battery with a first-stage current until a voltage of the battery reaches a first-stage voltage value. When the control unit operates in the second stage of charging, the control unit controls the charging-discharging module to charge the battery with a second-stage current until the voltage of the battery reaches a second-stage voltage value which is greater than the first-stage voltage value. The second-stage current is smaller than the first-stage current

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
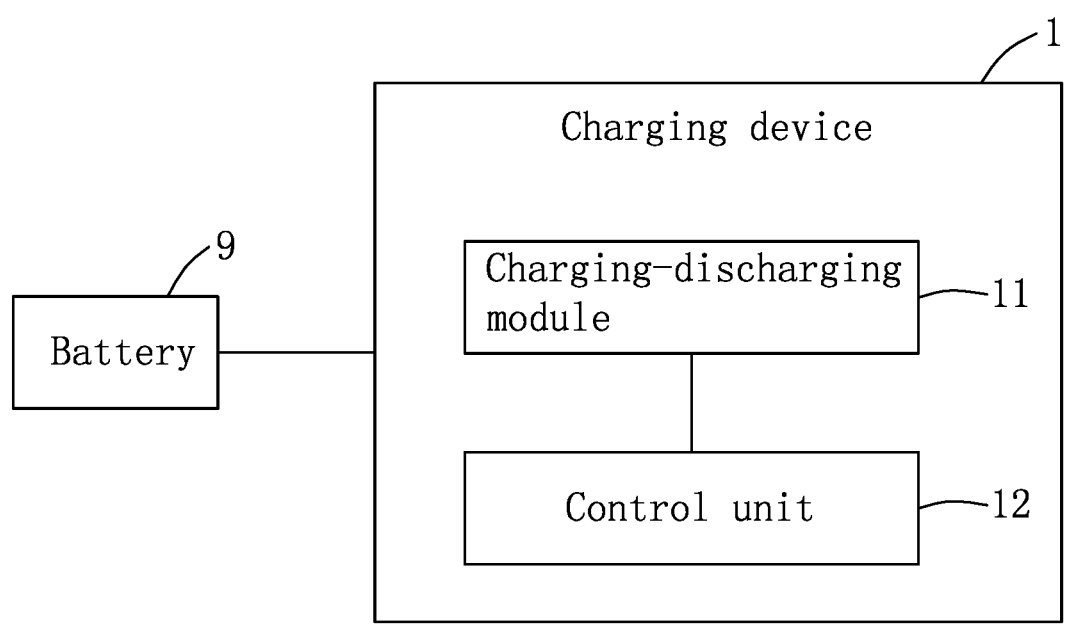
FIG. 1 is a block diagram illustrating an embodiment of the charging device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a charging device 1 according to this disclosure is adapted for charging a battery 9, and includes a charging-discharging module 11 and a control unit 12. The battery 9 is a rechargeable battery which is exemplified as a lithium-ion battery in this embodiment.

The control unit 12 is electrically connected to the charging-discharging module 11 in order to perform a charging method by controlling the charging-discharging module 11 to charge or discharge the battery 9. In detail, the charging device 1 may be exemplified as a charger. The control unit 12 is, for example, a microcontroller (MCU), a processor, an application-specific integrated circuit (ASIC), etc., which is capable of performing the charging method where the control unit 12 generates at least one control signal, and detects a charging current and a charging voltage used to charge the battery 9 during the charging procedure. The at least one control signal is related to at least a charging parameter including multiple voltage values, multiple current values, and/or multiple power values. The charging-discharging module 11 is, for example, a charging circuit, or a charging and discharging circuit, which receives the at least one control signal to charge the battery 9, to alternately charge and discharge the battery 9, or to alternately charge and not charge the battery 9, according to the charging parameters indicating predetermined voltage values, predetermined current values and/or predetermined power values that correspond to the at least one control signal.

It is noted that, in this embodiment, the charging method is performed by the charging device 1. In other embodiments, the charging method can be performed by a computerized terminal to charge the battery 9. The computerized terminal may be, for example, a smartphone, a smartwatch, a tablet computer, a virtual reality (VR) apparatus, an augmented reality (AR) apparatus, a personal computer, a palmtop computer, a personal digital assistant, etc. The computerized terminal may include a processor which has computation capability, and a storage device (e.g., a memory module, a hard disk drive, etc.) storing a computer program or computer instructions relating to the charging method. The processor of the computerized terminal may be realized as a system on chip (SOC), a central processing unit (CPU), an Advanced RISC Machine (ARM) processor, a field programmable gate array (FPGA), a dedicated processor, etc. The charging method may be performed when the processor executes the computer program or the computer instructions.

Figure 2:
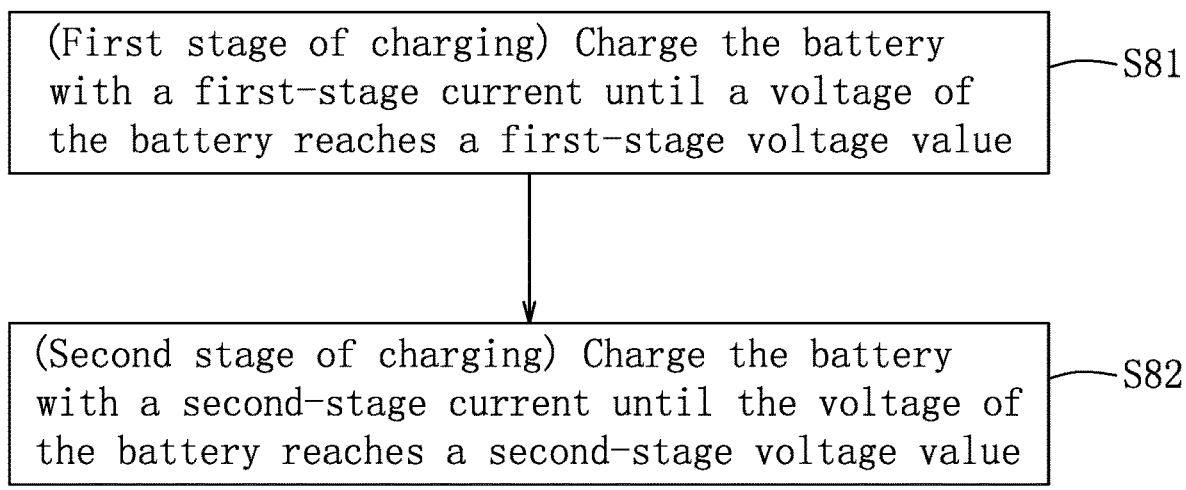
FIG. 2 is a flow chart illustrating first and second embodiments of the charging method according to this disclosure.

Further referring to FIG. 2, the first embodiment of the charging method according to this disclosure is shown to include step S81 and step S82.

In step S81, the control unit 12 of the charging device 1 operates in a first stage of charging, where the control unit 12 controls the charging-discharging module 11 to charge the battery 9 with a first-stage current until a voltage of the battery 9 (i.e., a voltage between a positive electrode and a negative electrode of the battery 9, where the voltage is monitored during the charging) reaches a first-stage voltage value. The first-stage current is the charging current that is used to charge the battery 9 in the first stage.

In detail, the first-stage current may be the constant current which is used in the first stage of the conventional charging method (i.e., the constant current charging), or a varying current (i.e., a current with a varying magnitude). For example, the control unit 12 may control the charging-discharging module 11 to charge the battery 9 with a constant voltage in the first stage, so that the first-stage current corresponding to the constant voltage will vary. What is important is that the battery 9 can be charged using the first-stage current until the voltage of the battery 9 reaches the first-stage voltage value. The first-stage voltage value is a charging limit voltage, which is the charging limit voltage for the battery cell mentioned in the prior art section.

In step S82, the control unit 12 operates in a second stage of charging, where the control unit 12 controls the charging-discharging module 11 to charge the battery 9 with a second-stage current until the voltage of the battery 9 reaches a second-stage voltage value. The second-stage voltage value refers to a voltage value of the battery 9 when a predetermined cut-off condition for the charging is satisfied, where the cut-off condition may be a cut-off current value set for the second-stage current, a cut-off state of charge set for the electric charge in the battery 9, or, of course, a cut-off voltage value set for the voltage of the battery 9. It is noted that the second-stage voltage value is greater than the first-stage voltage value, and the second-stage current is smaller than the first-stage current. The second-stage current is the charging current that is used to charge the battery 9 in the second stage.

In detail, the second stage includes N sub-stages, where N is a positive integer. When the control unit 12 operates in an $i^{th}$ sub-stage, which is one of the N sub-stages, the control unit 12 controls the charging-discharging module 11 to charge the battery 9 with a constant current ($i^{th}$ current) of which the magnitude is an $i^{th}$ current value, with a constant voltage ($i^{th}$ voltage) of which the magnitude is an $i^{th}$ voltage value or with a constant power ($i^{th}$ power) of which the magnitude is an $i^{th}$ power value. The $i^{th}$ current value, the $i^{th}$ voltage value or the $i^{th}$ power value may be a predetermined value and corresponds to the second-stage current in the $i^{th}$ sub-stage. For the sake of simplicity of expression, "charging the battery 9 with a constant current/voltage/power of which the magnitude is a specific value" will from now on be expressed as "charging at the specific value".

In more detail, the second-stage current that is used to charge the battery 9 in the first sub-stage and that corresponds to the one of the first current, the first voltage and the first power is smaller than the first-stage current. The second-stage current used to charge the battery 9 at the $(i+1)^{th}$ sub-stage, which corresponds to the one of the $(i+1)^{th}$ current, the $(i+1)^{th}$ voltage and the $(i+1)^{th}$ power, is smaller than or equal to the second-stage current used to charge the battery 9 at the $i^{th}$ sub-stage, which corresponds to the one of the $i^{th}$ current, the $i^{th}$ voltage and the $i^{th}$ power. The charging voltage used to charge the battery 9 at the $(i+1)^{th}$ sub-stage and corresponding to the one of the $(i+1)^{th}$ current, the $(i+1)^{th}$ voltage and the $(i+1)^{th}$ power is greater than or equal to the charging voltage used to charge the battery 9 at the $i^{th}$ sub-stage and corresponding to the one of the $i^{th}$ current, the $i^{th}$ voltage and the $i^{th}$ power. In some implementations, charging power that is used to charge the battery 9 in the $(i+1)^{th}$ sub-stage and that corresponds to the one of the $(i+1)^{th}$ current, the $(i+1)^{th}$ voltage and the $(i+1)^{th}$ power is smaller than or equal to charging power that is used to charge the battery 9 in the $i^{th}$ sub-stage and that corresponds to the one of the $i^{th}$ current, the $i^{th}$ voltage and the $i^{th}$ power. When the control unit 12 operates in the $N^{th}$ sub-stage of the second stage, the control unit 12 controls the charging-discharging module 11 to charge the battery 9 at one of the $N^{th}$ current, the $N^{th}$ voltage and the $N^{th}$ power until the voltage of the battery 9 reaches the second-stage voltage value.

In this disclosure, the second-stage current is controlled to be smaller than the first-stage current in such a way that an anode potential of the battery 9 will not be lower than a lithium deposition potential. The lithium deposition potential may be derived using the following method. The method includes a step of producing three-electrode cells that basically have the same specification as the battery 9 but each has one more electrode compared to the battery 9. The three electrodes include an anode, a cathode and a reference electrode, which is made of lithium. The three-electrode cells are employed in a test procedure for deriving the lithium deposition potential of the anode of the battery 9.

In the test procedure, the three-electrode cells are charged and discharged at different C-rates (e.g., 1C, 2C, 3C for different three-electrode cells) multiple times (e.g., ten times), and a voltage between the anode and the reference electrode of each three-electrode cell is monitored during the charging and discharging processes. Then, the three-electrode cells are disassembled when fully charged, and observation is then made to the anodes of the three-electrode cells that are charged at different C-rates to see if lithium deposition happens (i.e., to see if there is lithium precipitated on a surface of the anode for each three-electrode cell). After determining the greatest C-rate at which lithium deposition does not happen in the three-electrode cells, the minimum voltage between the anode and the reference electrode of the three-electrode cell that is charged and discharged at the greatest C-rate serves as the lithium deposition potential. It is noted that the current used to charge or discharge a battery is often represented in a form of C-rate, which is a measure of the rate at which the battery is charged or discharged relative to its capacity. The capacity of a battery is generally given in Ah or mAh. As an example, when a battery has a capacity of 1200 mAh, a C-rate of 1C means that the current to charge the battery has a magnitude of 1200 mA, and a C-rate of 0.2C means that the current to charge the battery has a magnitude of 240 mA.

In the example that three three-electrode cells are charged respectively at 1C, 2C, 3C ten times, assuming that lithium deposition does not happen to the anodes of the three-electrode cells that are charged at 1C and 2C but happens to the anode of the three-electrode cell that is charged at 3C, the minimum voltage between the anode and the reference electrode of the three-electrode cell that is charged at 2C during the charging and discharging is taken to serve as the lithium deposition potential for the anode of the battery 9.

Furthermore, the lithium deposition potential for the cathode of the battery 9 can be derived in the similar way, and details thereof are omitted herein for the sake of brevity. Based on the abovementioned test procedure for deriving the lithium deposition potential of the anode of the battery 9, the anode potential in this disclosure refers to a potential difference between the anode and the reference electrode, i.e., an anode-to-lithium potential, and an cathode potential in this disclosure refers to a potential difference between the cathode and the reference electrode, i.e., a cathode-to-lithium potential.

In this embodiment, the second-stage voltage value is smaller than an oxidative decomposition voltage of an electrolyte of the battery 9. The oxidative decomposition voltage of the electrolyte of the battery 9 can be understood as a potential threshold in a way that, when a potential of the battery 9 exceeds the potential threshold, an irreversible reductive or oxidative decomposition reaction may happen to the molecules of a solvent, an additive, or even impurity at an interface between the electrodes and the electrolyte, which is called decomposition of electrolyte. The potential threshold is the reductive decomposition voltage or the oxidative decomposition voltage of the electrolyte of the battery 9.

Figure 3:
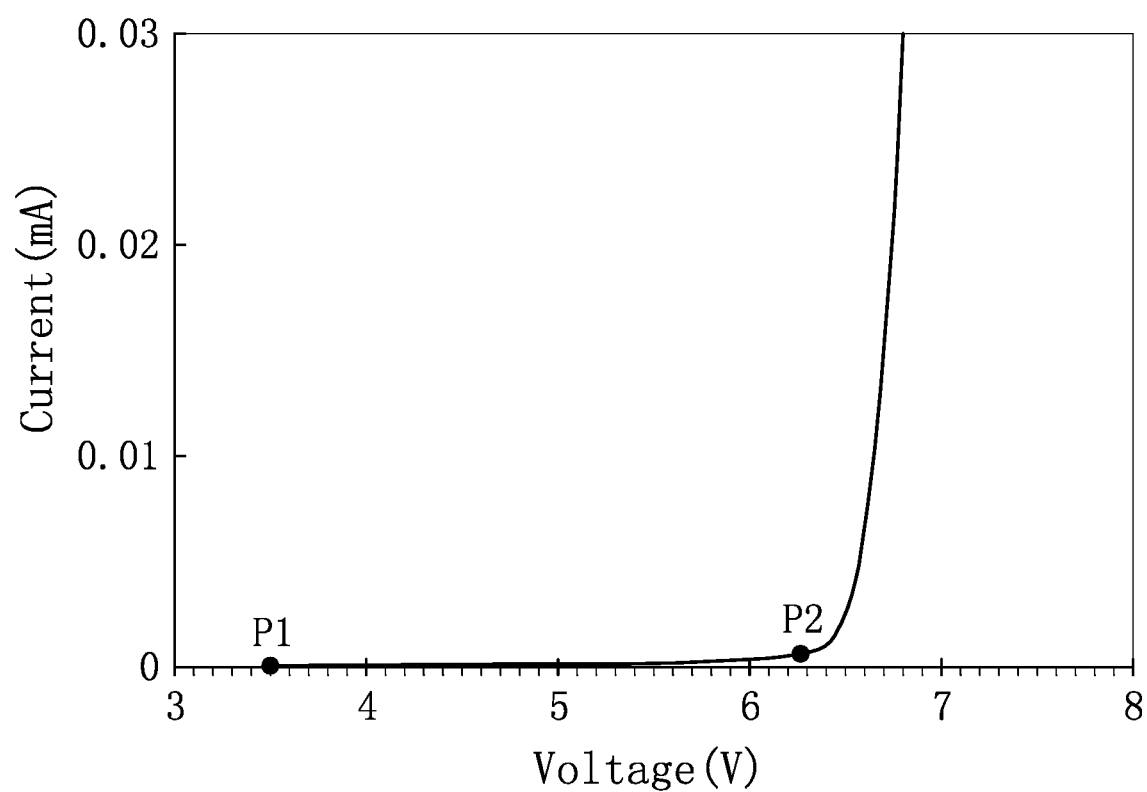
FIG. 3 is a plot illustrating a relationship of current versus voltage for a battery.

The oxidative decomposition voltage of the electrolyte may be derived through the following test procedure. For example, a symmetric cell battery (such as a button cell battery which uses platinum electrodes) that is injected with corresponding electrolyte (i.e., the electrolyte used in the battery 9 of this embodiment) is made to be applied with a gradually increasing voltage, and a measurement equipment is used to perform a voltage-to-current scan on the symmetric cell battery to obtain a relationship between voltage and current, as shown in FIG. 3, where the horizontal axis depicts voltage and the vertical axis depicts current. In more detail, after the voltage is applied, a current value that is sampled by the measurement equipment at the second voltage point is taken as an initial current value (corresponding to a point (P1) in FIG. 3); and then, the applied voltage gradually increases, and when a current value that is sampled by the measurement equipment has reached one hundred times the initial current value, the corresponding voltage is taken as the oxidative decomposition voltage of the electrolyte, which corresponds to a voltage of 6.2 volts at a point (P2) in FIG. 3. Furthermore, the second-stage voltage value is smaller than or equal to the first-stage voltage value plus 500 millivolts (mV).

When the control unit 12 operates in the $N^{th}$ sub-stage of the second stage, the control unit 12 controls the charging-discharging module 11 to charge the battery 9 until the voltage of the battery 9 reaches the second-stage voltage value that corresponds to a cut-off condition which may be a cut-off voltage value, a cut-off current value or a cut-off state of charge. In more detail, in the $N^{th}$ sub-stage, when the second-stage current generated by the charging-discharging module 11 reaches the cut-off current value, when the voltage of the battery 9 reaches the cut-off voltage value, or when a state of charge of the battery 9 reaches the cut-off state of charge, the control unit 12 controls the charging-discharging module 11 to stop charging the battery 9, i.e., cutting off the charging. The cut-off voltage value, the cut-off current value and the cut-off state of charge for the battery 9 may be derived by the test procedure using the abovementioned three-electrode cells and by observing the cathode of the three-electrode cells to see if excessive lithium extraction happens, so as to ensure that the electric energy stored in the battery 9 which is fully charged using the proposed charging method matches the electric energy stored in the battery 9 which is fully charged using the conventional charging method, and to ensure that excessive lithium extraction does not happen to the cathode of the battery 9.

In this embodiment, a value of the first-stage current, the first-stage voltage value, the corresponding one of the $i^{th}$ current value, the $i^{th}$ voltage value and the $i^{th}$ power value for the $i^{th}$ sub-stage of the second stage, the second-stage voltage value, and the corresponding one of the cut-off voltage value, the cut-off current value and the cut-off state of charge may be pre-stored in the battery 9 or the control unit 12, so the control unit 12 may read these pre-stored values to correctly control the charging-discharging module 11 to charge the battery 9.

Figure 4:
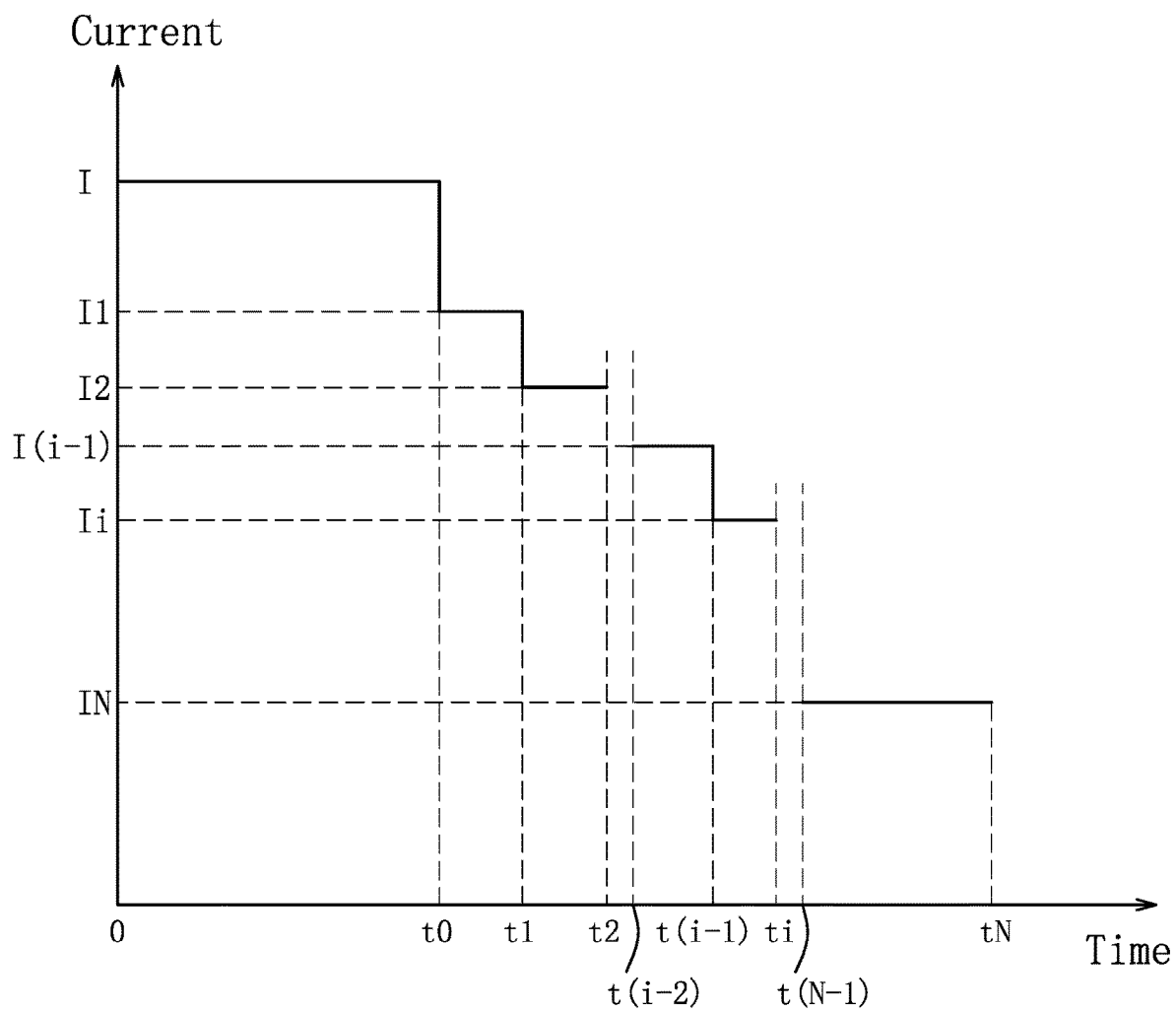
FIG. 4 is a timing diagram illustrating a first implementation of the first embodiment.

FIG. 4 is a timing diagram exemplarily illustrating a first implementation of the first embodiment, where the horizontal axis depicts time and the vertical axis depicts current. At time t0, t1, t2, ..., t(i−1), ti, ..., and tN, the magnitude of the voltage of the battery 9 is Vc1, V1, V2, ..., V(i−1), Vi, ..., and VN, respectively. It is noted that, throughout this specification, time t0 represents an end point of the first stage, and time ti represents an end point of the $i^{th}$ sub-stage of the second stage, noting that i represents an arbitrary one of positive integers from one to N.

From time 0 to time t0 (i.e., the first stage), the control unit 12 controls the charging-discharging module 11 to charge the battery 9 at a current value I (i.e., a magnitude of the first-stage current) until the voltage of the battery 9 reaches the voltage value Vc1 (i.e., the first-stage voltage value). From time t0 to time t1 (i.e., the first sub-stage), the charging is performed at a current value I1 (i.e., the first current value) until the voltage of the battery 9 reaches the voltage value V1. From time t1 to t2 (i.e., the second sub-stage), the charging is performed at a current value I2 (i.e., the second current value) until the voltage of the battery 9 reaches the voltage value V2; and from time t2 to time t(i−2), the charging is performed in a similar manner, so details thereof are not plotted in FIG. 4 for the sake of clarity. From time t(i−2) to time t(i−1) (i.e., the $(i-1)^{th}$ sub-stage), the charging is performed at a current value I(i−1) (i.e., the $(i-1)^{th}$ current value) until the voltage of the battery 9 reaches the voltage value V(i−1). From time t(i−1) to time ti (i.e., the $i^{th}$ sub-stage), the charging is performed at a current value Ii (i.e., the $i^{th}$ current value) until the voltage of the battery 9 reaches the voltage value Vi; and from time ti to time t(N−1), the charging is performed in a similar manner, so details thereof are not plotted in FIG. 4 for the sake of clarity. From time t(N−1) to time tN (i.e., the $N^{th}$ sub-stage), the charging is performed at a current value IN (i.e., the $N^{th}$ current value) until the voltage of the battery 9 reaches the voltage value VN (i.e., the cut-off voltage value).

In other words, at each of the sub-stages of the second stage, the control unit 12 controls the charging-discharging module 11 to charge the battery 9 with a constant second-stage current. Moreover, I>I1≥I2≥ ... ≥IN, and Vc1<V1≥V2≥ ... ≥VN. In one example, 5C>Ii>0.1C, I>Ii≥(I−0.5C), and VN<4.65 volts.

Figure 5:
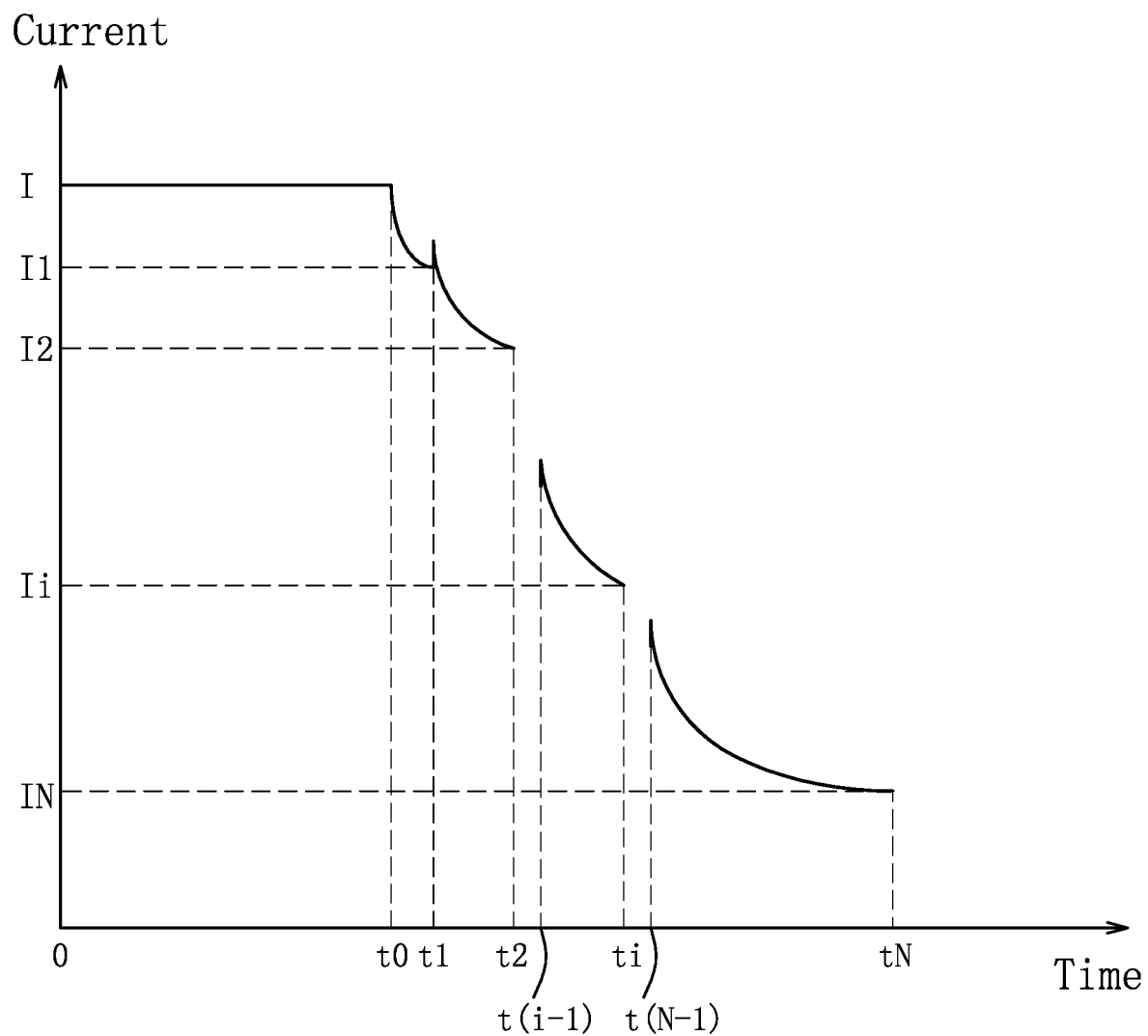
FIG. 5 is a timing diagram illustrating a second implementation of the first embodiment.

FIG. 5 is a timing diagram exemplarily illustrating a second implementation of the first embodiment, where the horizontal axis depicts time and the vertical axis depicts current. At time t0, t1, t2, ..., ti, ..., and tN, the magnitude of the current to charge the battery 9 is I, I1, I2, ..., Ii, ..., and IN, respectively.

From time 0 to time t0 (i.e., the first stage), the control unit 12 controls the charging-discharging module 11 to charge the battery 9 at the current value I until the voltage of the battery 9 reaches a voltage value Vc1 (i.e., the first-stage voltage value). From time t0 to time t1 (i.e., the first sub-stage), the charging is performed at a voltage value V1 (i.e., the first voltage value) until the second-stage current is reduced to I1. From time t1 to time t2 (i.e., the second sub-stage), the charging is performed at a voltage value V2 (i.e., the second voltage value) until the second-stage current is reduced to the current value I2; and from time t2 to time t(i−1), the charging is performed in a similar manner, so details thereof are not plotted in FIG. 5 for the sake of clarity. From time t(i−1) to time ti (i.e., the $i^{th}$ sub-stage), the charging is performed at a voltage value Vi (i.e., the $i^{th}$ voltage value) until the second-stage current is reduced to Ii; and from time ti to time t(N−1), the charging is performed in a similar manner, so details thereof are not plotted in FIG. 5 for the sake of clarity. From time t(N−1) to time tN (i.e., the $N^{th}$ sub-stage), the charging is performed at a voltage value VN (i.e., the $N^{th}$ voltage value) until the second-stage current is reduced to IN (i.e., the cut-off current value).

In other words, in each of the sub-stages of the second stage, the control unit 12 controls the charging-discharging module 11 to charge the battery 9 with a constant charging voltage. It is noted that V1<Vc1, making the second-stage current in the first sub-stage smaller than the first-stage current. In addition, V1≤V2≤ ... ≤VN, and I1≤I2≤ ... ≤IN. In one example, Vi≤4.65 volts, Ii-I(i+1)≤0.5C, namely, I(i+1)≥Ii−0.5C.

Figure 6:
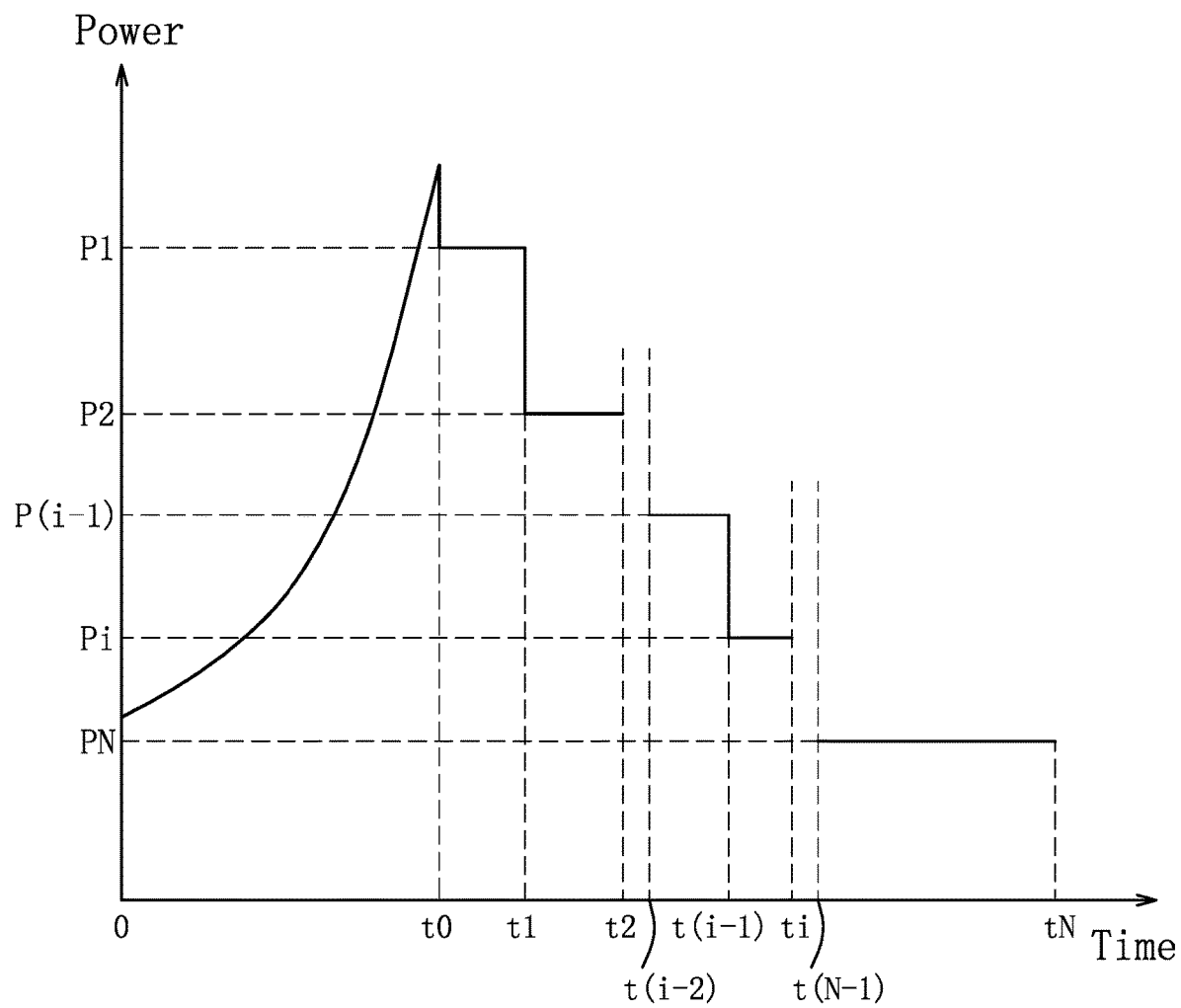
FIG. 6 is a timing diagram illustrating a third implementation of the first embodiment.

FIG. 6 is a timing diagram exemplarily illustrating a third implementation of the first embodiment, where the horizontal axis depicts time and the vertical axis depicts power. At time t0, t1, t2, ..., t(i−1), ti, ..., and tN, the magnitude of the voltage of the battery 9 is Vc1, V1, V2, ..., V(i−1), Vi, ..., and VN, respectively.

From time 0 to time t0 (i.e., the first stage), the control unit 12 controls the charging-discharging module 11 to charge the battery 9 at a current value I (i.e., a magnitude of the first-stage current) until the voltage of the battery 9 reaches the voltage value Vc1 (i.e., the first-stage voltage value). From time t0 to time t1 (i.e., the first sub-stage), the charging is performed at a power value P1 (i.e., the first power value). From time t1 to time t2 (i.e., the second sub-stage), the charging is performed at a power value P2 (i.e., the second power value); and from time t2 to time t(i−2), the charging is performed in a similar manner, so details thereof are not plotted in FIG. 6 for the sake of clarity. From time t(i−2) to time t(i−1) (i.e., the $(i-1)^{th}$ sub-stage), the charging is performed at a power value P(i−1) (i.e., the $(i-1)^{th}$ power value). From time t(i−1) to time ti (i.e., the $i^{th}$ sub-stage), the charging is performed at a power value Pi (i.e., the $i^{th}$ power value); and from time ti to time t(N−1), the charging is performed in a similar manner, so details thereof are not plotted in FIG. 6 for the sake of clarity. From time t(N−1) to time tN (i.e., the $N^{th}$ sub-stage), the charging is performed at a power value PN (i.e., the $N^{th}$ power value) until the voltage of the battery 9 reaches the voltage value VN (i.e., the cut-off voltage value).

In other words, in each of the sub-stages of the second stage, the control unit 12 controls the charging-discharging module 11 to charge the battery 9 with constant power. It is noted that P1<(I×Vc1), such that the second-stage current in the first sub-stage is smaller than the first-stage current. Moreover, P1≥P2≥ ... ≥PN, and V1≥ ... ≥V2≥VN.

Figure 7:
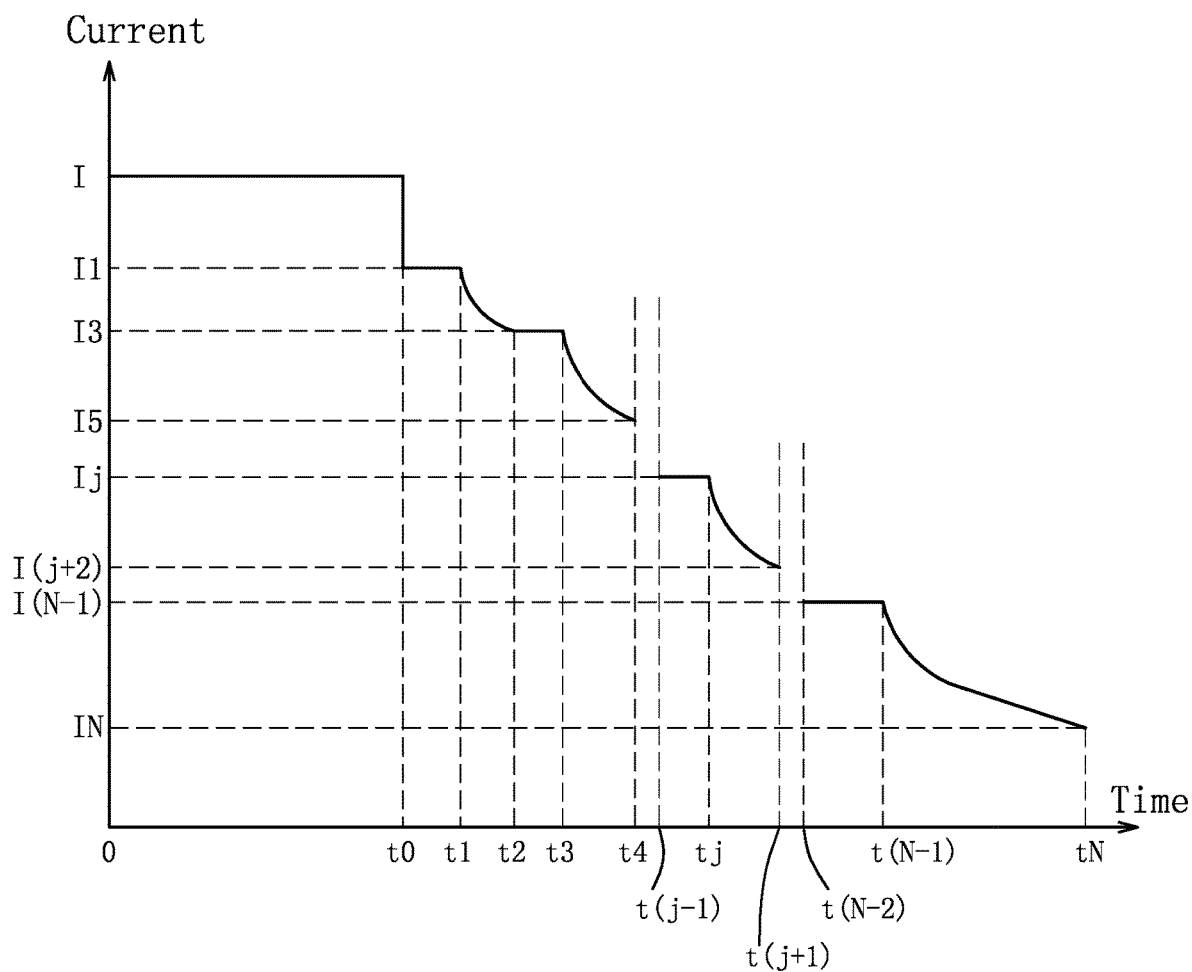
FIG. 7 is a timing diagram illustrating a fourth implementation of the first embodiment.

FIG. 7 is a timing diagram exemplary illustrating a fourth implementation of the first embodiment, where the horizontal axis depicts time and the vertical axis depicts current. At time t0, t1, t2, t3, t4, ..., t(j−1), tj, t(j+1), ..., t(N−1) and tN, the magnitude of the voltage of the battery 9 is Vc1, V2, V2, V4, V4, V(j−1), V(j+1), V(j+1), . . . , V(N−1) and VN, respectively, and the magnitude of the current to charge the battery 9 is I, I1, I3, I3, I5, . . . , Ij, Ij, I(j+2), . . . , I(N−1) and IN, respectively. It is noted that, time t0 represents an end point of the first stage, and time tj represents an end point of the $j^{th}$ sub-stage of the second stage, noting that j represents an arbitrary one of positive odd integers from one to N.

From time 0 to time t0 (i.e., the first stage), the control unit 12 controls the charging-discharging module 11 to charge the battery 9 at the current value I (i.e., a magnitude of the first-stage current) until the voltage of the battery 9 reaches the voltage value Vc1 (i.e., the first-stage voltage value). From time t0 to time t1 (i.e., the first sub-stage), the charging is performed at the current value I1 (i.e., the first current value) until the voltage of the battery 9 reaches the voltage value V2. From time t1 to time t2 (i.e., the second sub-stage), the charging is performed at the voltage value V2 (i.e., the second voltage value) until the second-stage current is reduced to I3. From time t2 to time t3 (i.e., the third sub-stage), the charging is performed at the current value I3 (i.e., the third current value) until the voltage of the battery 9 reaches the voltage value V4. From time t3 to time t4 (i.e., the fourth sub-stage), the charging is performed at the voltage value V4 (i.e., the fourth voltage value) until the second-stage current is reduced to I5. From time t4 to time t(j−1), the charging is performed in a similar manner, so details thereof are not plotted in FIG. 7 for the sake of clarity.

From time t(j−1) to time tj (i.e., the $j^{th}$ sub-stage), the charging is performed at the current value Ij (i.e., the $i^{th}$ current value) until the voltage of the battery 9 reaches the voltage value V(j+1). From time tj to time t(j+1) (i.e., the $(j+1)^{th}$ sub-stage), the charging is performed at the voltage value V(j+1) (i.e., the $(j+1)^{th}$ voltage value) until the second-stage current is reduced to I(j+1). From time t(j+1) to time t(N−2), the charging is performed in a similar manner, so details thereof are not plotted in FIG. 7 for the sake of clarity. From time t(N−2) to time t(N−1) (i.e., the $(N−1)^{th}$ sub-stage), the charging is performed at the current value I(N−1) (i.e., the $(N−1)^{th}$ current value) until the voltage of the battery 9 reaches the voltage value VN. From time t(N−1) to time tN (i.e., the $N^{th}$ sub-stage), the charging is performed at the voltage value VN (i.e., the $N^{th}$ voltage value) until the second-stage current is reduced to IN (i.e., the cut-off current value).

Figure 13:
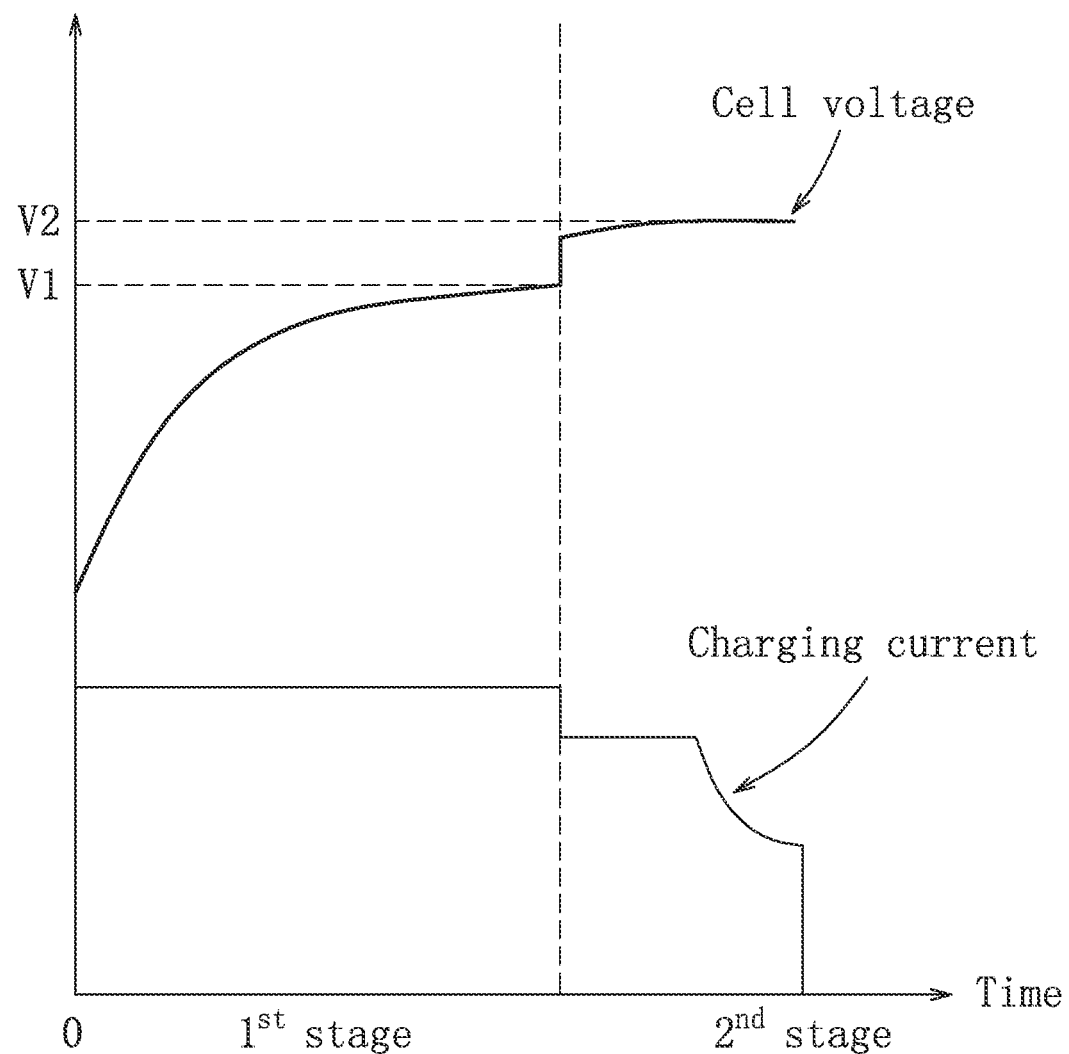

In other words, in each of the first, third, . . . , $j^{th}$, $(N−1)^{th}$ sub-stages of the second stage, the control unit 12 controls the charging-discharging module 11 to charge the battery 9 with a constant second-stage current; and, in each of the second, fourth, . . . , $(j+1)^{th}$, . . . , $N^{th}$ sub-stages of the second stage, the control unit 12 controls the charging-discharging module 11 to charge the battery 9 with a constant charging voltage. Namely, the battery 9 is charged alternately with different constant currents and constant voltages in the second stage, where I<I1≥I3≥ . . . ≥I(N−1), and V2≤V4≤VN. FIG. 13 exemplarily illustrates a change in cell voltage of the battery when the battery is charged using the fourth implementation of the first embodiment. In FIG. 13, the second stage is exemplified to include only two sub-stages, and V1 and V2 represent the first-stage voltage value and the second-stage voltage value, respectively.

The second embodiment of the charging method according to this disclosure also includes steps S81 and S82 as shown in FIG. 2, like the first embodiment. The second embodiment differs from the first embodiment in that, in the second embodiment, each of the sub-stages of the second stage includes a first portion and a second portion.

In one of the first and second portions of the $i^{th}$ sub-stage, the battery 9 is charged at a first $i^{th}$ sub-stage current value, which corresponds to the second-stage current and which is one of zero (i.e., the battery 9 is neither being charged nor being discharged in the first portion), a positive value (i.e., the battery 9 is being charged in the first portion) and a negative value (i.e., the battery 9 is being discharged in the first portion), for a first $i^{th}$ sub-stage time length Ti1. In the other one of the first and second portions of the $i^{th}$ sub-stage, the battery 9 is charged at a second $i^{th}$ sub-stage current value, which corresponds to the second-stage current and which is a positive value, for a second $i^{th}$ sub-stage time length Ti2. An absolute value of the first $i^{th}$ sub-stage current value is smaller than an absolute value of the second $i^{th}$ sub-stage current value.

In other words, in each of the sub-stages, the battery 9 is charged in a pulse-like manner. An average of the second-stage current in the first sub-stage is smaller than the first-stage current, i.e., (first first sub-stage current value*T11 second first sub-stage current value*T12)/(T11+T12) is smaller than the magnitude of the first-stage current. An average of the second-stage current in an $(i+1)^{th}$ sub-stage is smaller than an average of the second-stage current in the $i^{th}$ sub-stage, e.g., (first second sub-stage current value*T21+second second sub-stage current value*T22)/(T21+T22) is smaller than or equal to (first first sub-stage current value*T11+second first sub-stage current value*T12)/(T11+T12), (first third sub-stage current value*T31+second third sub-stage current value*T32)/(T31+T32) is smaller than or equal to (first second sub-stage current value*T21+second second sub-stage current value*T22)/(T21+T22), so on and so forth. A sum of Ti1 and Ti2 is a time length of the $i^{th}$ sub-stage.

In this embodiment, in the $i^{th}$ sub-stage, the battery 9 is charged or discharged at the first $i^{th}$ sub-stage current value for the time length Ti1 in the first portion, and charged at the second $i^{th}$ sub-stage current value for the time length Ti2 in the second portion after the first portion. In one embodiment, in the $i^{th}$ sub-stage, the battery 9 may be charged at the second $i^{th}$ sub-stage current value for the time length Ti2 in the first portion, and charged or discharged at the first $i^{th}$ sub-stage current value for the time length Ti1 in the second portion after the first portion. In one embodiment, in the $i^{th}$ sub-stage, the battery 9 may be neither charged nor discharged (i.e., no current flows into the battery 9, e.g., the battery 9 is left undisturbed) for the time length Ti1 in the first portion, and be charged at the second $i^{th}$ sub-stage current value for the time length Ti2 in the second portion after the first portion.

Figure 8:
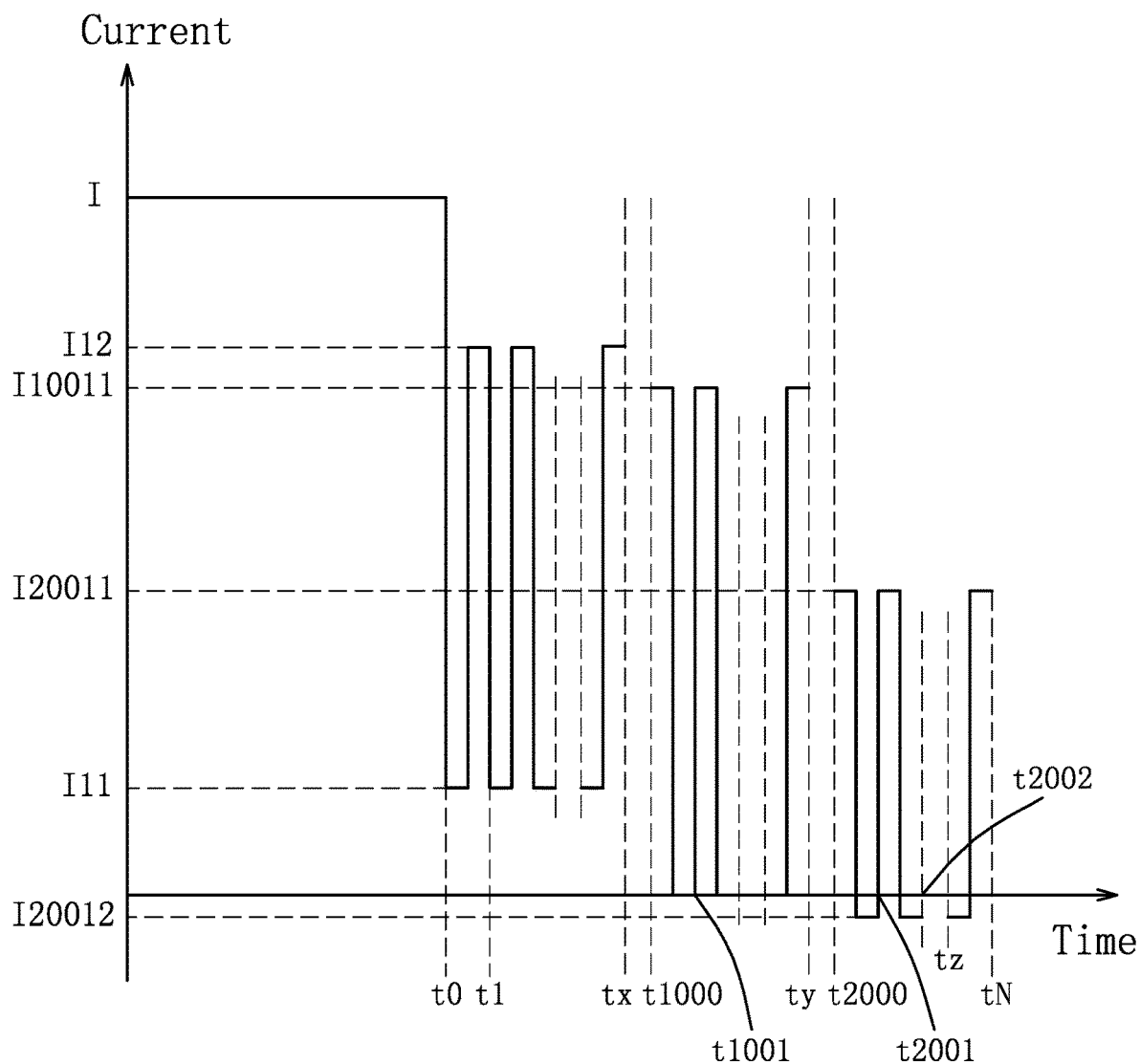
FIG. 8 is a timing diagram illustrating a first implementation of the second embodiment.

FIG. 8 is a timing diagram exemplarily illustrating a first implementation of the second embodiment, where the horizontal axis depicts time and the vertical axis depicts current. At time t0 and time tN, the magnitude of the voltage of the battery 9 is Vc1 and VN, respectively.

From time 0 to time t0 (i.e., the first stage), the control unit 12 controls the charging-discharging module 11 to charge the battery 9 at a current value I (i.e., a magnitude of the first-stage current) until the voltage of the battery 9 reaches the voltage value Vc1 (i.e., the first-stage voltage value). From time t0 to time t1000, (i.e., the first to thousandth sub-stages), the control unit 12 controls, in each of the first to thousandth sub-stages, the charging-discharging module 11 to charge the battery 9 at a current value I11 in the first portion, and at a current value I12 in the second portion. From time t1000 to time t2000, (i.e., the one-thousand-and-first to two-thousandth sub-stages), the control unit 12 controls, in each of the one-thousand-and-first to two-thousandth sub-stages, the charging-discharging module 11 to charge the battery 9 at a current value I10011 in the first portion, and not charge the battery 9 in the second portion. From time 0 to time t0 (i.e., the first stage), the control unit 12 controls the charging-discharging module 11 to charge the battery 9 at a current value I (i.e., a magnitude of the first-stage current) until the voltage of the battery 9 reaches the voltage value Vc1 (i.e., the first-stage voltage value). From time t2000 to time tN, (i.e., the two-thousand-and-first to $N^{th}$ sub-stages), the control unit 12 controls, in each of the two-thousand-and-first to $N^{th}$ sub-stages, the charging-discharging module 11 to charge the battery 9 at a current value I20011 in the first portion, and discharge the battery 9 at a current value I1200121 in the second portion. Such process continues until the voltage of the battery 9 reaches the voltage VN (i.e., the cut-off voltage value).

In other words, the N sub-stages of the second stage are classified into three different pulsating charging or pulsating charging-discharging sections for charging the battery 9. In this implementation, each of the sub-stages has the same time length, namely, (t1-t0)=(t1001-t1000)=(t2001-t2000). In other embodiments, different sub-stages may have the same or different time lengths.

The following paragraphs demonstrate effects of this disclosure using examples of charging the batteries that have the same specification using the conventional charging method, fifth to eighth implementations of the first embodiment, and a second implementation of the second embodiments, respectively. The batteries of the examples have a cathode composed of $LiCoO_2$, and an anode composed of graphite, along with separation films, an electrolyte, and a housing. And a process of producing the batteries includes the steps of mixing, coating, assembling, formatting, aging, etc. A reference electrode is disposed between the cathode and the anode for a part of cells, so as to make a three-electrode cell for testing and comparing a potential differential between the cathode and the anode during the charging. It is noted that, in the following examples, the first-stage voltage value is 4.4 volts, which is equivalent to the charging limit voltage, but this disclosure is not limited to lithium-ion batteries with the charging limit voltage of 4.4 volts, and is applicable to lithium-ion batteries of different voltages.

The conventional charging method includes the following steps, which are performed at 45 degrees Celsius:
  1. Using a constant charging current of 0.7C to charge the battery until a voltage of the battery (i.e., a voltage between a positive electrode and a negative electrode of the battery, where the voltage is monitored during the charging) reaches 4.4 volts; and
  2. Using a constant charging voltage of 4.4 volts to charge the battery until a charging current that corresponds to the constant charging voltage of 4.4 volts reaches 0.05C (i.e., the cut-off current value).

In order to test a capacity retention rate of the battery under this charging method, the following steps are subsequently performed:
  3. Leaving the battery undisturbed for five minutes;
  4. Using a constant discharging current of 0.5C to discharge the battery until the voltage of the battery (i.e., the voltage between the positive electrode and the negative electrode of the battery, where the voltage is monitored during the discharging) reaches 3 volts;
  5. Leaving the battery undisturbed for five minutes; and
  6. Repeating steps 1 to 5 for 500 cycles.

The fifth implementation of the first embodiment includes the following steps, which are performed at 45 degrees Celsius:
  1. In the first stage, using a constant charging current of 0.7C (i.e., the first-stage current) to charge the battery until a voltage of the battery reaches 4.4 volts (i.e., the first-stage voltage value);
  2. In the first sub-stage of the second stage, using a constant charging current of 0.5C (i.e., the first current value) to charge the battery until the voltage of the battery reaches 4.45 volts; and
  3. In the second sub-stage of the second stage, using a constant charging voltage of 4.45 volts (i.e., the second voltage value) to charge the battery until a charging current that corresponds to the constant charging voltage of 4.45 volts reaches 0.12C (i.e., the cut-off current value).

In order to test a capacity retention rate of the battery under this charging method, the following steps are subsequently performed:
  4. Leaving the battery undisturbed for five minutes;
  5. Using a constant discharging current of 0.5C to discharge the battery until the voltage of the battery reaches 3 volts;
  6. Leaving the battery undisturbed for five minutes; and
  7. Repeating steps 1 to 6 for 500 cycles.

Figure 9:
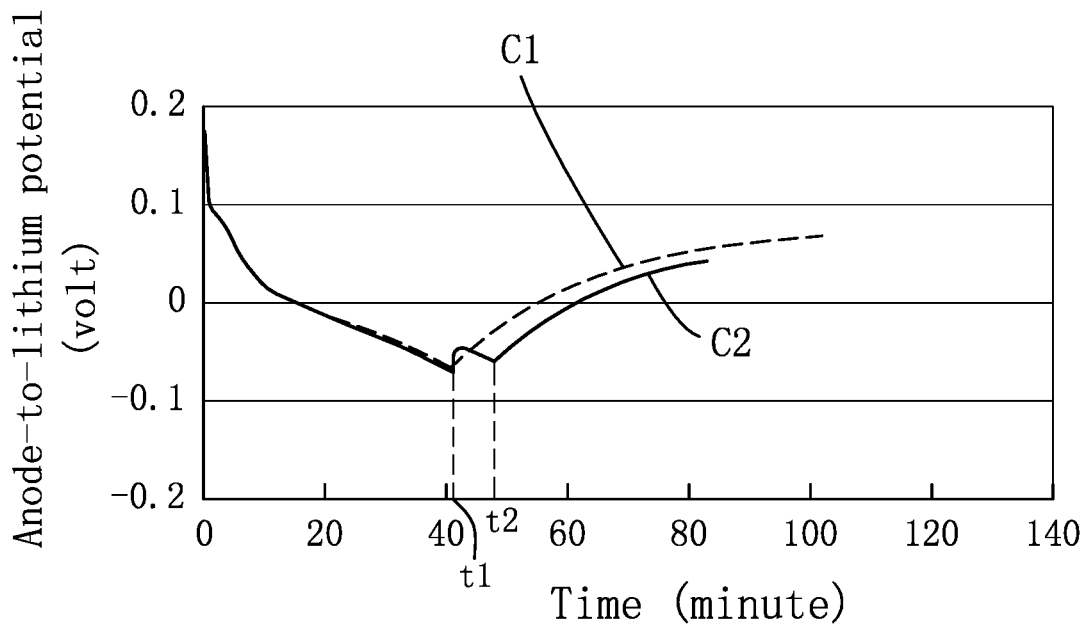
FIG. 9 is a timing diagram illustrating variation of an anode-to-lithium potential of a battery being charged using the conventional charging method and the fifth implementation of the first embodiment.

FIG. 9 illustrates variation of the anode-to-lithium potential during steps 1 and 2 of the conventional charging method and during steps 1 to 3 of the fifth implementation of the first embodiment, where the vertical axis depicts anode-to-lithium potential in volts, the horizontal axis depicts time in minutes, the curve C1 corresponds to the conventional charging method, and the curve C2 corresponds to the fifth implementation of the first embodiment. At time t1, step 1 of the fifth implementation of the first embodiment is finished, i.e., the first stage in which the constant charging current is used for charging until the voltage of the battery reaches the first-stage voltage value is finished. Subsequently, in the first sub-stage of the second stage, the charging continues with a lower charging current (0.50<0.7C). Accordingly, the anode-to-lithium potential using the fifth implementation is not lower than that using the conventional charging method at this time, thus avoiding a risk of lithium deposition. On the other hand, time t2 is a joint between the first and second sub-stages of the second stage.

Figure 10:
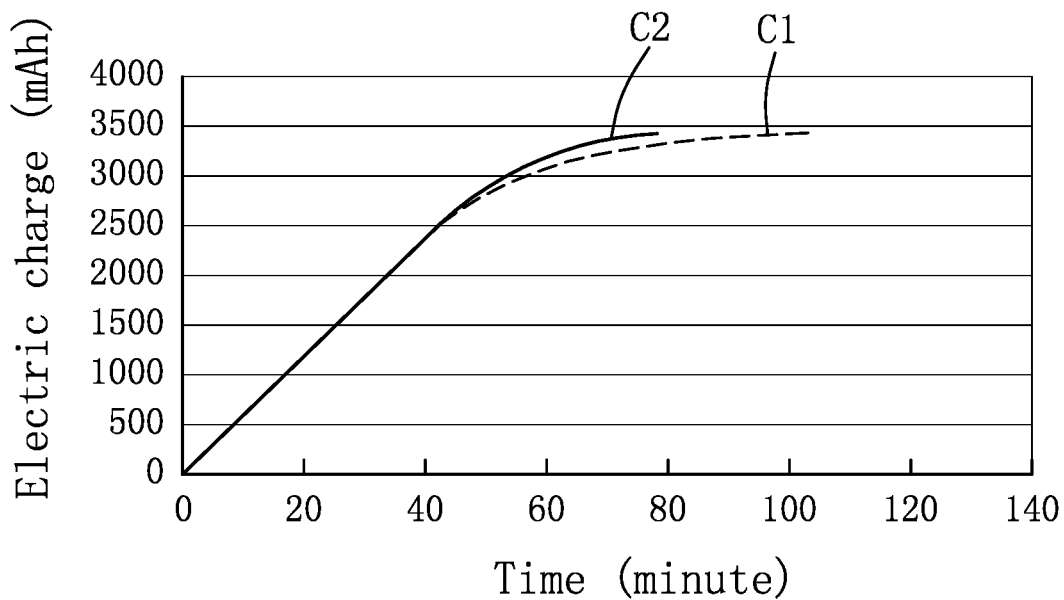
FIG. 10 is a timing diagram illustrating variation of a state of charge of a battery being charged using the conventional charging method and the fifth implementation of the first embodiment.

FIG. 10 illustrates variations of the state of charge during steps 1 and 2 of the conventional charging method and during steps 1 to 3 of the fifth implementation of the first embodiment, where the vertical axis depicts electric charge of the battery in mAh, the horizontal axis depicts time in minutes, the curve C1 corresponds to the conventional charging method, and the curve C2 corresponds to the fifth implementation of the first embodiment. It is evident that, to charge the battery to the same state of charge, such as fully charged (e.g., approximately 3500 mAh), the fifth implementation of the first embodiment takes less charging time in comparison to the conventional charging method. In addition, since the fifth implementation has a greater cut-off current (0.12C>0.05C), excessive lithium extraction is less likely to occur to the cathode of the battery.

Figure 11:
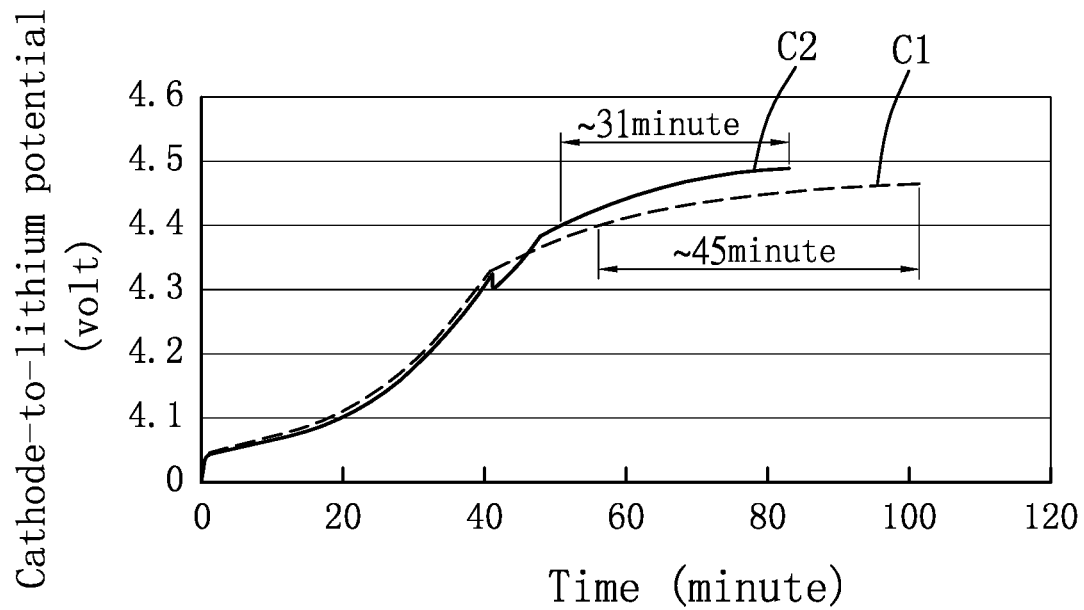
FIG. 11 is a timing diagram illustrating variation of a cathode-to-lithium potential of a battery being charged using the conventional charging method and the fifth implementation of the first embodiment.

FIG. 11 illustrates variation of the cathode-to-lithium potential during steps 1 and 2 of the conventional charging method and during steps 1 to 3 of the fifth implementation of the first embodiment, where the vertical axis depicts cathode-to-lithium potential in volts, the horizontal axis depicts time in minutes, the curve C1 corresponds to the conventional charging method, and the curve C2 corresponds to the fifth implementation of the first embodiment. Time lengths during which the cathode-to-lithium potential is greater than 4.4 volts for the conventional charging method and the fifth implementation are 45 minutes and 31 minutes, respectively. Because the time length during which the cathode-to-lithium potential of the battery is reduced quite significantly, the fifth implementation may have a reduced possibility of having side reactions at the cathode of the battery, thereby promoting a life time of the battery.

Figure 12:
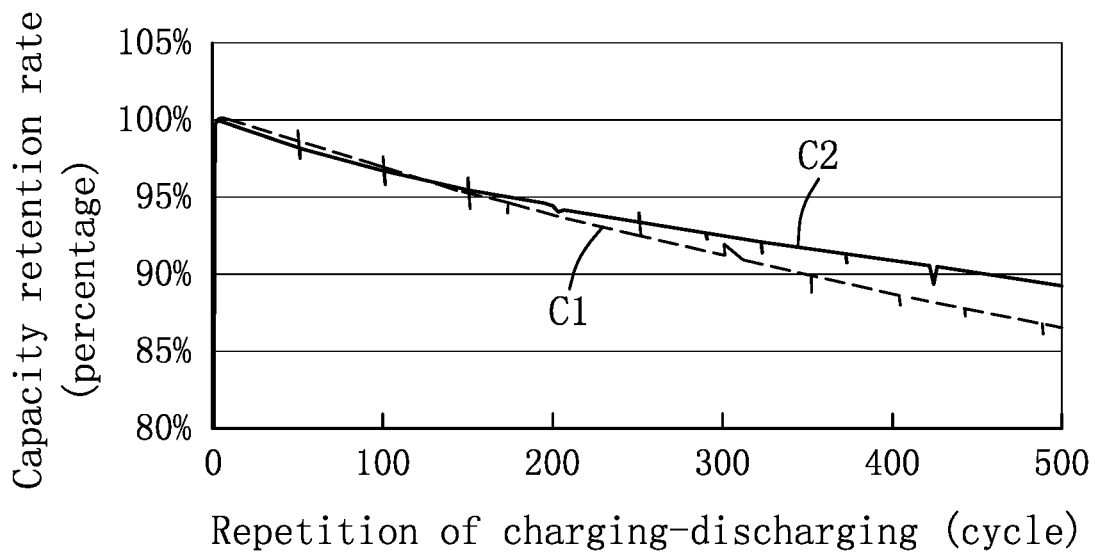
FIG. 12 is a timing diagram illustrating variation of a capacity retention rate of a battery being charged using the conventional charging method and the fifth implementation of the first embodiment and FIG. 13 is a timing diagram exemplarily illustrating a change in cell voltage when the fourth implementation of the first embodiment is used to charge a battery.

FIG. 12 illustrates variation of capacity retention rate during step 6 of the conventional charging method and during step 7 of the fifth implementation of the first embodiment, where the vertical axis depicts capacity retention rate in percentage, the horizontal axis depicts a number of repetitions in cycles, the curve C1 corresponds to the conventional charging method, and the curve C2 corresponds to the fifth implementation of the first embodiment. It is evident in FIG. 12 that using the fifth embodiment leads to a higher capacity retention rate than using the conventional charging method after 500 high-temperature cycles.

The sixth implementation of the first embodiment includes the following steps, which are performed at 45 degrees Celsius:

1. In the first stage, using a constant charging current of 0.7C (i.e., the first-stage current) to charge the battery until a voltage of the battery reaches 4.4 volts (i.e., the first-stage voltage value);
2. In the first sub-stage of the second stage, using a constant charging current of 0.5C (i.e., the first current value) to charge the battery until the voltage of the battery reaches 4.45 volts;
3. In the second sub-stage of the second stage, using a constant charging current of 0.4C (i.e., the second current value) to charge the battery until the voltage of the battery reaches 4.54 volts (i.e., the cut-off voltage value);
4. Leaving the battery undisturbed for five minutes;
5. Using a constant discharging current of 0.5C to discharge the battery until the voltage of the battery reaches 3 volts;
6. Leaving the battery undisturbed for five minutes; and
7. Repeating steps 1 to 6 for 500 cycles.

The seventh implementation of the first embodiment includes the following steps, which are performed at 45 degrees Celsius:

1. In the first stage, using a constant charging current of 0.7C (i.e., the first-stage current) to charge the battery until a voltage of the battery reaches 4.4 volts (i.e., the first-stage voltage value);
2. In the first sub-stage of the second stage, using a constant charging voltage of 4.35 volts (i.e., the first voltage value) to charge the battery until a charging current that corresponds to the constant charging voltage of 4.35 volts reaches 0.4C;
3. In the second sub-stage of the second stage, using a constant charging voltage of 4.45 volts (i.e., the second voltage value) to charge the battery until a charging current that corresponds to the constant charging voltage of 4.45 volts reaches 0.13C (i.e., the cut-off current value);
4. Leaving the battery undisturbed for five minutes;
5. Using a constant discharging current of 0.5C to discharge the battery until the voltage of the battery reaches 3 volts;
6. Leaving the battery undisturbed for five minutes; and
7. Repeating steps 1 to 6 for 500 cycles.

The eighth implementation of the first embodiment includes the following steps, which are performed at 45 degrees Celsius:

1. In the first stage, using a constant charging current of 0.7C (i.e., the first-stage current) to charge the battery until a voltage of the battery reaches 4.4 volts (i.e., the first-stage voltage value);
2. In the first sub-stage of the second stage, using a constant charging power of 7W (i.e., the first power value) to charge the battery until the voltage of the battery reaches 4.45 volts;
3. In the second sub-stage of the second stage, using a constant charging power of 5.5W (i.e., the second power value) to charge the battery until the voltage of the battery reaches 4.55 volts (i.e., the cut-off power value);
4. Leaving the battery undisturbed for five minutes;
5. Using a constant discharging current of 0.5C to discharge the battery until the voltage of the battery reaches 3 volts;
6. Leaving the battery undisturbed for five minutes; and
7. Repeating steps 1 to 6 for 500 cycles.

The second implementation of the second embodiment includes the following steps, where the second stage includes a first type of charging, which corresponds the second step to the fourth step, and a second type of charging, which corresponds to the fifth step to the seventh step. The following steps are performed at 45 degrees Celsius:

1. In the first stage, using a constant charging current of 0.7C (i.e., the first-stage current) to charge the battery until a voltage of the battery reaches 4.4 volts (i.e., the first-stage voltage value);
2. Neither charging nor discharging the battery for 2.9 seconds (i.e., the first portion of each of the sub-stages that correspond to the first type of charging);
3. Using a constant charging current of 0.650 to charge the battery for 7.1 seconds (i.e., the second portion of each of the sub-stages that correspond to the first type of charging);
4. Repeating steps 2 and 3 until the voltage of the battery is greater than or equal to 4.45 volts;
5. Using a constant discharging current of 0.050 to discharge the battery for one second (i.e., the first portion of each of the sub-stages that correspond to the second type of charging);
6. Using a constant charging current of 0.410 to charge the battery for 9 seconds (i.e., the second portion of each of the sub-stages that correspond to the second type of charging);
7. Repeating steps 5 and 6 until the voltage of the battery is greater than or equal to 4.54 volts;
8. Leaving the battery undisturbed for five minutes;
9. Using a constant discharging current of 0.5C to discharge the battery until the voltage of the battery reaches 3 volts;
10. Leaving the battery undisturbed for five minutes; and
11. Repeating steps 1 to 10 for 500 cycles.

For each of the abovementioned conventional charging method, the fifth to eighth implementations of the first embodiment of the charging method according to this disclosure, and the second implementation of the second embodiment of the charging method according to this disclosure, the capacity retention rate of the battery after 500 cycles of charging-discharging and the time to fully charge the battery in the first cycle are listed in Table 1.

| Charging method | Capacity retention rate | Time to fully charge the battery (minutes) |
| --- | --- | --- |
| Conventional | 86.1% | 108.8 |
| 5th implementation of 1st embodiment | 89.3% | 82.5 |
| 6th implementation of 1st embodiment | 92.2% | 81.4 |
| 7th implementation of 1st embodiment | 93.1% | 80.1 |
| 8th implementation of 1st embodiment | 88.5% | 85.2 |
| 2nd implementation of 2nd embodiment | 90.7% | 84.2 |

In summary, the charging method according to this disclosure proposes to use the first-stage current to charge the battery 9 until the voltage of the battery 9 reaches the first-stage voltage value in the first stage, and use at least one of a constant current, a constant voltage or a constant power to charge the battery in the second stage. In other words, in the second stage, charging may be performed in one or more abovementioned manner, or in a manner of pulse-like charging or pulse-like charging-discharging. Since the final voltage to charge the battery 9 increases from the first-stage voltage value to the second-stage voltage value, the charging speed in the second stage is promoted. Furthermore, in the proposed embodiments, the charging parameters are well controlled to ensure that lithium deposition does not happen to the anode, and cut-off condition is carefully determined to ensure that lithium extraction does not happen to the cathode. So, the time length of the second stage in which the cathode has a relatively high potential is shortened, and the possibility of side reactions occurring between the cathode and the electrolyte under the high cathode potential is reduced. Thus, the life time and the charging speed for the battery are promoted.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A charging method, comprising:
   in a first stage of charging, charging a battery with a first-stage current until a voltage of the battery reaches a first-stage voltage value; and
   in a second stage of charging, charging the battery with a second-stage current until the voltage of the battery reaches a second-stage voltage value; wherein the second-stage voltage value is greater than the first-stage voltage value, and the second-stage current is smaller than the first-stage current;
   wherein the first-stage voltage value is equal to a charging limit voltage value for the battery, and the second-stage voltage value is smaller than an oxidative decomposition voltage of an electrolyte of the battery.

2. The charging method of claim 1, wherein the second stage includes N sub-stages, wherein N is a positive integer; wherein: in an $i^{th}$ sub-stage, which is one of the N sub-stages, the battery is charged at one of an $i^{th}$ current, an $i^{th}$ voltage and an $i^{th}$ power;
   in an $(i+1)^{th}$ sub-stage, the battery is charged at one of an $(i+1)^{th}$ current, an $(i+1)^{th}$ voltage and an $(i+1)^{th}$ power; and
   the $(i+1)^{th}$ current has a current value equal to or smaller than that of the $i^{th}$ current.

3. The charging method of claim 2, wherein the battery is charged to the second-stage voltage value in the $N^{th}$ sub-stage, with a charge condition of an $N^{th}$ current, an $N^{th}$ voltage or an $N^{th}$ power.

4. The charging method of claim 3, wherein the second-stage voltage value is smaller than or equal to the first-stage voltage value plus 500 millivolts (mV).

5. The charging method of claim 2, wherein: the battery is charged at the $i^{th}$ voltage in the $i^{th}$ sub-stage, and is charged at the $(i+1)^{th}$ voltage in the $(i+1)^{th}$ sub-stage; and
   the $(i+1)^{th}$ voltage is greater than or equal to the $i^{th}$ voltage.

6. The charging method of claim 2, wherein: the battery is charged at the $i^{th}$ power in the $i^{th}$ sub-stage, and is charged at the $(i+1)^{th}$ power in the $(i+1)^{th}$ sub-stage; and
   the $(i+1)^{th}$ power is smaller than or equal to the $i^{th}$ power.

7. The charging method of claim 1, wherein: the second stage includes N sub-stages, wherein N is a positive integer, and each of the sub-stages includes a first portion and a second portion;
   in one of the first portion and the second portion of an $i^{th}$ sub-stage, which is one of the N sub-stages, the battery is charged at a first $i^{th}$ sub-stage current for a time length of Ti1, wherein the first $i^{th}$ sub-stage current has a current value that is zero, a positive value or a negative value;
   in the other one of the first portion and the second portion of the $i^{th}$ sub-stage, the battery is charged at a second $i^{th}$ sub-stage current for a time length of Ti2; and
   an absolute value of a current value of the first $i^{th}$ sub-stage current is smaller than that of the second $i^{th}$ sub-stage current.

8. The charging method of claim 7, wherein an average of the second-stage current in the first sub-stage is smaller than the first-stage current, and an average of the second-stage current in an $(i+1)^{th}$ sub-stage is smaller than an average of the second-stage current in the sub-stage.

9. A computer-readable medium, storing one or more programs, the one or more programs including a plurality of instructions, wherein when the plurality of instructions are executed by a computerized terminal with one or more processors, the plurality of instructions cause the computerized terminal to perform a charging method, comprising:
   in a first stage of charging, charging a battery with a first-stage current until a voltage of the battery reaches a first-stage voltage value; and in a second stage of charging, charging the battery with a second-stage current until the voltage of the battery reaches a second-stage voltage value; wherein the second-stage voltage value is greater than the first-stage voltage value, and the second-stage current is smaller than the first-stage current;

wherein the first-stage voltage value is equal to a charging limit voltage value for the battery, and the second-stage voltage value is smaller than an oxidative decomposition voltage of an electrolyte of the battery.

10. A charging device adapted for charging a battery, comprising:

a charging-discharging module adapted to be electrically connected to the battery for charging or discharging the battery; and a control unit electrically connected to said charging-discharging module, and configured to operate in one of a first stage and a second stage of charging, wherein the control unit controls the charging-discharging module to charge the battery;

wherein: when the control unit operates in the first stage of charging, the control unit controls the charging-discharging module to charge the battery with a first-stage current until a voltage of the battery reaches a first-stage voltage value;

when the control unit operates in the second stage of charging, the control unit controls the charging-discharging module to charge the battery with a second-stage current until the voltage of the battery reaches a second-stage voltage value which is greater than the first-stage voltage value; and the second-stage current is smaller than the first-stage current;

wherein the first-stage voltage value is equal to a charging limit voltage value for the battery, and the second-stage voltage value is smaller than an oxidative decomposition voltage of an electrolyte of the battery.

11. The charging device of claim 10, wherein the second stage includes N sub-stages, wherein N is a positive integer;

wherein: in an $i^{th}$ sub-stage, which is one of the N sub-stages, the control unit controls the charging-discharging module to charge the battery at one of an $i^{th}$ current, an $i^{th}$ voltage and an $i^{th}$ power;

in an $(i+1)^{th}$ sub-stage, the control unit controls the charging-discharging module to charge the battery at one of an $(i+1)^{th}$ current, an $(i+1)^{th}$ voltage and an $(i+1)^{th}$ power; and the $(i+1)^{th}$ current has a current value smaller than that of the $i^{th}$ current.

12. The charging device of claim 11, wherein the battery is charged to the second-stage voltage value in the $N^{th}$ sub-stage, wherein the control unit controls the charging-discharging module to charge the battery at one of an $N^{th}$ current, an $N^{th}$ voltage and an $N^{th}$ power.

13. The charging device of claim 12, wherein a difference of the second-stage voltage value and the first-stage voltage value is equal to or smaller than 500 millivolts (mV).

14. The charging device of claim 11, wherein: the control unit controls the charging-discharging module to charge the battery at the $i^{th}$ voltage in the $i^{th}$ sub-stage, and charge the battery at the $(i+1)^{th}$ voltage in the $(i+1)^{th}$ sub-stage; and the $(i+1)^{th}$ voltage is greater than or equal to the $i^{th}$ voltage.

15. The charging device of claim 11, wherein: the control unit controls the charging-discharging module to charge the battery at the $i^{th}$ power in the $i^{th}$ sub-stage, and charge the battery at the $(i+1)^{th}$ power in the $(i+1)^{th}$ sub-stage; and the $(i+1)^{th}$ power is smaller than or equal to the $i^{th}$ power.

16. The charging device of claim 10, wherein: the second stage includes N sub-stages, wherein N is a positive integer, and each of the sub-stages includes a first portion and a second portion;

in one of the first portion and the second portion of an $i^{th}$ sub-stage, which is one of the N sub-stages, the control unit controls the charging-discharging module to charge the battery at a first $i^{th}$ sub-stage current for a time length of Ti1, wherein the first $i^{th}$ sub-stage current has a current value equal to zero, a positive value or a negative value;

in the other one of the first portion and the second portion of the $i^{th}$ sub-stage, the control unit controls the charging-discharging module to charge the battery at a second $i^{th}$ sub-stage current for a time length of Ti2; and an absolute value of a current value of the first $i^{th}$ sub-stage current is smaller than that of the second $i^{th}$ sub-stage current.

17. The charging device of claim 16, wherein an average of the second-stage current in the first sub-stage is smaller than the first-stage current, and an average of the second-stage current in an $(i+1)^{th}$ sub-stage is smaller than an average of the second-stage current in the $i^{th}$ sub-stage.

* * * * *